United States Patent [19]

Brackman, Jr.

[11] Patent Number: 4,825,350
[45] Date of Patent: Apr. 25, 1989

[54] METHOD AND APPARATUS FOR DETECTING A REDUCTION IN THE INPUT VOLTAGE TO A POWER SUPPLY

[75] Inventor: William D. Brackman, Jr., Salem, Va.

[73] Assignee: General Electric Company, Salem, Va.

[21] Appl. No.: 222,660

[22] Filed: Jul. 21, 1988

[51] Int. Cl.⁴ ............................................. H02H 7/122
[52] U.S. Cl. ....................................... 363/56; 363/21; 363/97; 340/663; 361/92
[58] Field of Search ...................... 363/20, 21, 50, 55, 363/56, 97, 131; 361/18, 88, 92; 340/660, 661, 663

[56] References Cited

U.S. PATENT DOCUMENTS

| | | | |
|---|---|---|---|
| 4,573,112 | 2/1986 | Numata et al. | 363/97 |
| 4,628,429 | 12/1986 | Walker | 363/97 |
| 4,688,158 | 8/1987 | Peterson et al. | 363/97 |
| 4,717,997 | 1/1988 | Hata | 340/661 |
| 4,737,853 | 4/1988 | Graves et al. | 363/56 |
| 4,745,299 | 5/1988 | Eng et al. | 363/21 |
| 4,763,238 | 8/1988 | Maige | 363/56 |

Primary Examiner—Peter S. Wong
Attorney, Agent, or Firm—Arnold E. Renner

[57] ABSTRACT

A scheme for detecting reduced source of voltage of a controlled switching power supply including a transformer employs the inherent insolation characteristics of the transformer to yield an isolated alarm signal indicative of a failed or inadequate source voltage.

14 Claims, 3 Drawing Sheets

METHOD AND APPARATUS FOR DETECTING A REDUCTION IN THE INPUT VOLTAGE TO A POWER SUPPLY

BACKGROUND OF THE INVENTION

The present invention relates generally to power supplies and more particularly to a method and apparatus for detecting a reduction, such as an impending or actual loss, in input power or voltage to a regulated power supply.

It is well known in the art to supply apparatus such as microprocessors with electrical power from a supply and to provide some indication of inpending loss of input power/voltage (i.e., from the utility) so that data within the volatile portion of the microprocessor are not lost; that is, steps may be taken by the microprocessor to preserve this data. One such known power supply is what is termed a half wave, pulse width modulated (PWM) regulated switching power supply, sometimes called a flyback switching power supply. This type of power supply provides isolation through the use of a transformer. Isolation is required because of the voltage sensitivity of the load which, for example, operates at a nominal five-volt level. As such, any power line transient directly coupled to the load could easily result in the destruction or serious damage to that load.

Typically, in these power supplies, a detecting means is provided at the source side of the power supply and an alarm signal is coupled to the load side (e.g., the microprocessor) by way of appropriate isolating means such as an optical coupler. Such isolation schemes are generally satisfactory and have been well proven but do suffer from at least two major deficiencies. The first of these is that the source side voltage level (e.g., 120 volts) necessitates power level components which tend to be more expensive than signal level components. The second major disadvantage is that the isolating coupler is itself a source of potential failure as well as a fairly expensive item.

SUMMARY OF THE INVENTION

It is, therefore, an object of the present invention to provide an improved method and apparatus for determining, with regard to a switching power supply, a reduction in voltage of the input such as by impending or actual loss thereof.

A further object is to provide an improved scheme for providing an electrically isolated output indicative of an impending loss of input power to a pulse width modulated regulated switching system without the necessity of separate isolating means.

It is a still further object to provide a low cost scheme for providing an isolated output indicative of an impending failure of input power, which scheme avoids the necessity of separate isolating means, through the employment of the natural isolation characteristics of a transformer of the power supply.

The foregoing and other objects are achieved, in accordance with the present invention, through the provision of a pulse width modulated regulated switching power supply in which a capacitor is repeatedly charged by an input voltage to a value representative thereof. This capacitor is then discharged through a transformer primary winding by switching means which is periodically rendered conductive and selectively rendered nonconductive. The output voltage of the power supply is developed utilizing a transformer secondary winding in circuit with a means which permits current in the secondary winding only when the switching means on the primary side is not conducting. The voltage across the secondary winding is sensed during the absence of the current through that winding and a timing signal generated during the periods when this voltage exceeds a predetermined magnitude. When the timing signal is absent for a prescribed period of time, an alarm signal is generated indicative of the fact of a reduction in source voltage.

BRIEF DESCRIPTION OF THE DRAWING

While the invention is defined in particularity in the claims annexed to and forming a part of this specification, a better understanding of the invention can be had from the following description taken in conjunction with the accompanying drawing in which:

DETAILED DESCRIPTION

Figure 1:
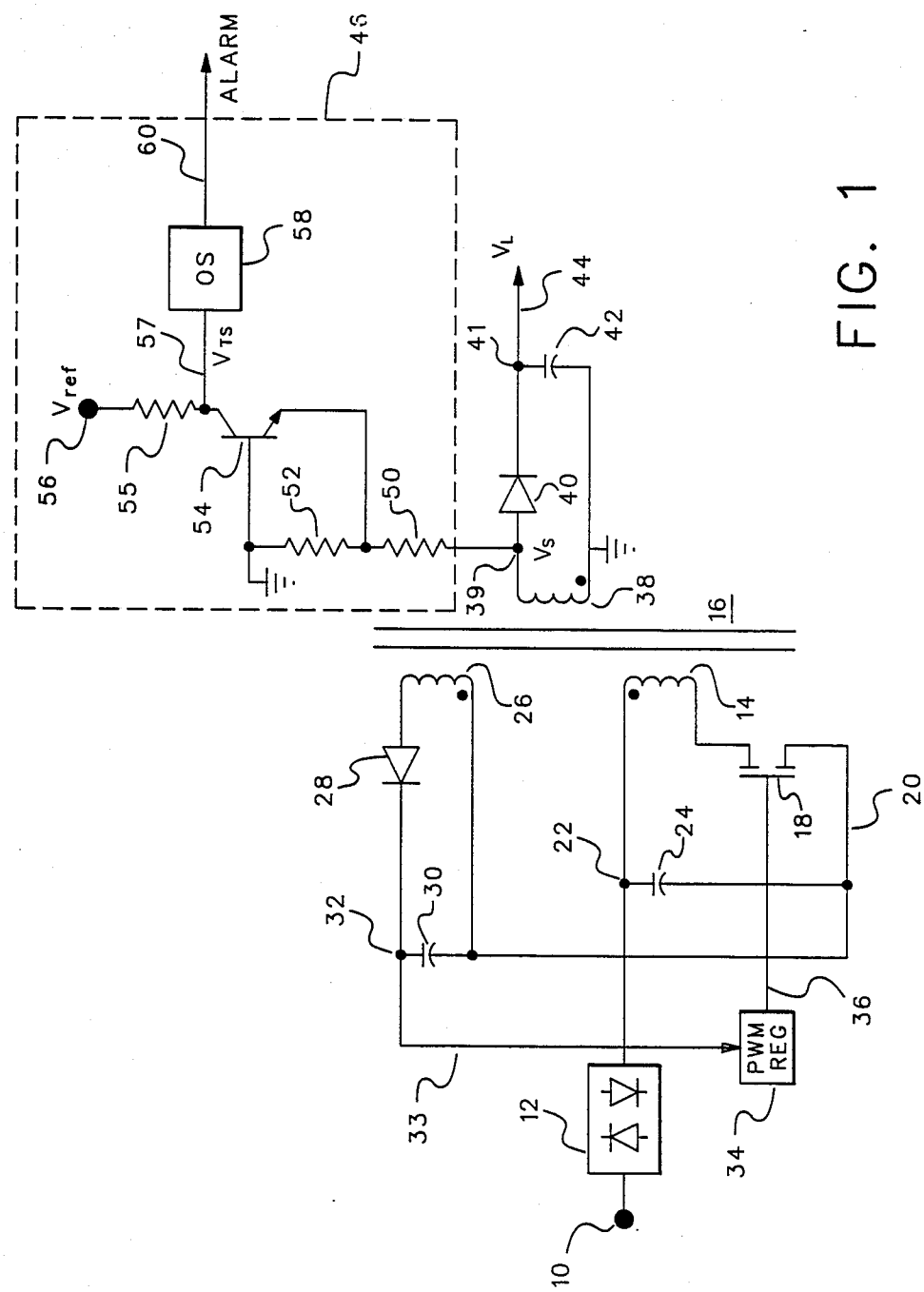
FIG. 1 is a schematic/block diagram illustrating a typical pulse width modulated regulated switching power supply employing the voltage reduction feature of the present invention.

Referencing now FIG. 1, there is shown in schematic/block form a typical pulse width modulated (PWM) regulated switching power supply (often called a flyback switching power supply) which has associated therewith the detection system of the present invention. In FIG. 1, that portion of the drawing outside of the dashed line block 46 is the typical power supply while that within the dashed line block is the detection system of the invention in association with the power supply. A source of electrical voltage (power), for example a utility line, is illustrated by terminal 10. This terminal is connected to a full wave rectifier 12, the DC output of which is applied to one terminal of a primary winding 14 of a transformer indicated generally at 16. The other end of the primary winding 14 is connected to a suitable switching means here shown as the drain electrode of a field effect transistor (FET) 18. The source electrode of the FET is connected to the system common 20. The gate electrode of the transistor 18 is connected to a PWM regulator 34 as will be described hereinafter. It will be apparent as this description precedes that other switching devices, such as a "standard" transistor could be used in place of FET 18. The junction point, node 22, of the rectifier 12 and winding 14, is connected to one terminal of a capacitor 24 the other terminal of which is connected to the common bus 20.

A feedback path for regulation of the FET 18, and hence the power, supply in general includes a transformer secondary winding 26 having one end connected by way of a suitable rectifying means such as a diode 28 to one plate of a capacitor 30. The other end of capacitor 30 is connected to the other end of the transformer secondary winding 26 and also to the common bus 20. The junction point of the diode 28 and capacitor 30, node 32, is connected via line 33 to the PWM regulator 34 to provide a feedback signal thereto. The output of the regulator 34 is connected via line 36 to the gate electrode of the FET 18 to control the conduction of that transistor and hence the operation of the power supply as will be more fully described hereinafter.

On the output side of the transformer 16, a secondary winding 38 is in series circuit with a rectifier, such as a diode 40, and an output filter capacitor 42. The junction point of the diode 40 and the capacitor 42, i.e., node 41 is connected to a line 44 upon which appears the load voltage to which the system is applicable, i.e., the supply to a microprocessor. The junction point of the winding 38 and the capacitor 42 is connected to earth ground.

The detection scheme of the present invention is depicted within the dashed line block 46. It is seen that this system includes a voltage divider comprised of series connected resistors 50 and 52 with one end of the voltage divider being connected to the junction point, node 39, of the secondary winding 38 and the diode 40 and the other end connected to earth ground and to the base of a suitable switching device such as transistor 54. The emitter of the transistor 54 is connected to the junction of the two resistors 50 and 52 while the collector is connected via a resistor 55 to terminal 56 to which is applied a reference voltage. The collector of transistor 54 is also connected, via line 57, to a suitable timing device such as a monostable multivibrator or one-shot 58. The output of one-shot 58, on line 60, is the alarm signal in accordance with the present invention. This signal is available for any desired purpose such as to cause a microprocessor load to act to preserve its volatile data. As will be more fully understood as this description proceeds, the alarm signal is developed when there is a reduction in the input voltage terminal 10 as would occur with an impending or an actual loss of power or in the event of a severe drop in line voltage.

Figure 2:
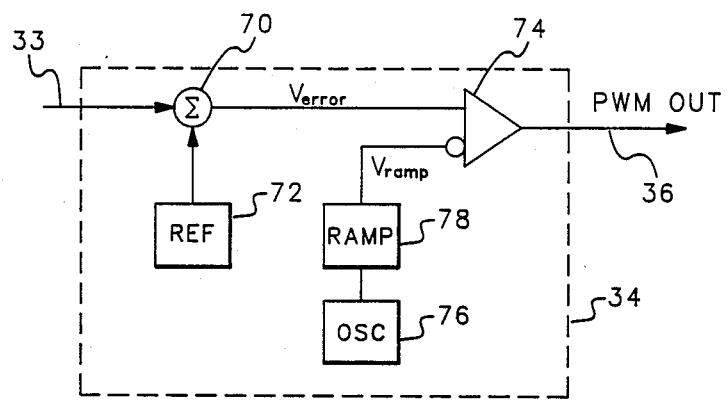
FIG. 2 is a block diagram illustrating in greater detail one of the major blocks shown in FIG. 1.

Before beginning the description of the operation of the circuitry of FIG. 1, reference is made to FIG. 2 which illustrates, in block form, the details of one possible implementation of the PWM regulator 34 of FIG. 1. As shown, the feedback signal on line 33 is supplied to a summing junction 70 the other input to which is a reference signal from block 72. This reference signal has a value which represents the desired operational output voltage of the system on line 44. (It will be recognized from the configuration of FIG. 1 that, because of the similarity of the circuits associated with the two secondary windings 26 and 38, the output on line 44 will be directly proportional to the signal on line 33.) The output of the summing junction 70 is an error signal ($V_{error}$) which is applied to the non-inverting input of a comparator 74. The other input to the comparator 74, at the inverting input, is the output of a ramp function generator 78 which, under the control of an oscillator 76, provides a ramp function of a fixed frequency and predetermined maximum magnitude. The output (PWM OUT) of the regulator 34 is supplied to the gate electrode of FET 18 and serves to turn the transistor off when the ramp function is greater than the value of the $V_{error}$ signal.

Figure 3:
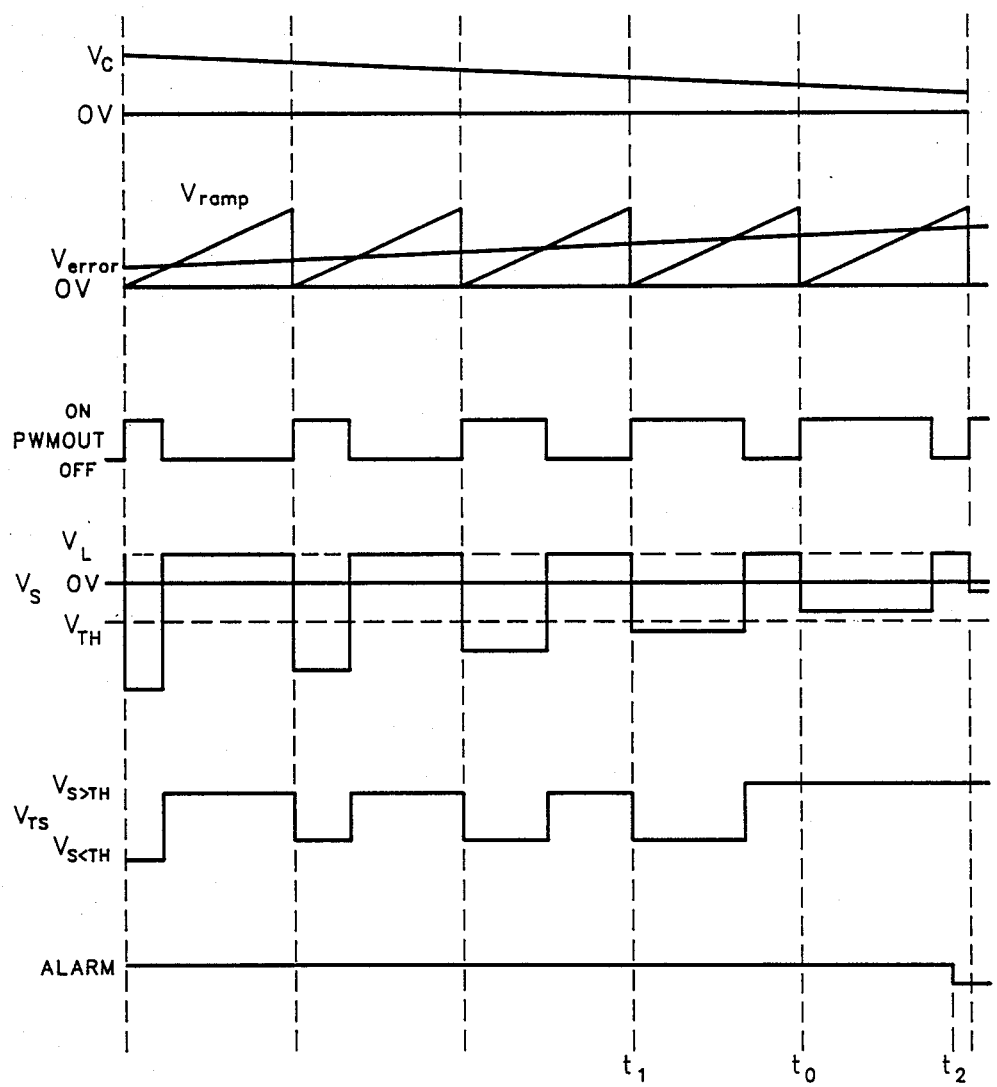
FIG. 3 is a multiple trace timing diagram, drawn to the same time base, helpful in understanding the present invention; and, FIG. 4 is a schematic diagram illustrating an alternate implementation of the voltage level detector employed in the embodiment of FIG. 1.

The operation of the circuitry just described with respect to FIGS. 1 and 2 can be better understood when taken in conjunction with the several traces of FIG. 3 which are drawn to the same time base. It will be recognized by those skilled in the art that capacitor 24 will be charged, essentially, to the output voltage of the rectifier 12 when transistor 18 is non-conductive and will discharge through the primary winding 14 when the transistor 18 is conducting. The polarity dots on the several transformer windings 14, 26 and 38 reflect the relative polarities of those windings.

For purposes of this discussion it will be assumed that the voltage on capacitor 24 is declining in value as is illustrated by the line labeled $V_C$ in the upper trace of FIG. 3. This declining voltage could result from an impending loss of the input voltage at terminal 10. With the declining capacitor voltage, $V_C$, the feedback path including transformer secondary winding 26 and its associated capacitor 30, provides a feedback signal to the PWM regulator 34 on line 33. This feedback signal is combined with the reference signal from block 72 in junction 70 to yield a signal ($V_{error}$) which is increasing in value. This latter signal is illustrated in the second trace of FIG. 3. The $V_{error}$ signal serves as one input to comparator 74. The other input to comparator 74 is the ramp signal output of the ramp function generator 78. This ramp signal is of constant maximum magnitude and constant frequency. Thus, the output of the PWM regulator, the output of the comparator 74, will be such that there is an ever increasing length of time in which the transistor 18 is maintained in the on position. This is illustrated in the third trace of FIG. 3 wherein the high level signal represents the "on time" of the transistor and the low level portion represents the "off time".

The fourth trace in FIG. 3 illustrates the voltage VS as seen at node 39, the junction point of the transformer secondary winding 38 and the diode 40. This is the input to the detection circuit of the present invention. It will be recognized from standard transformer theory and by the polarities earlier indicated that the voltage at node 39 will be proportional to a constant ($-K$) times the value of the voltage of the capacitor 24, (voltage $V_C$). Also shown in this fourth trace is a threshold level $V_{TH}$. The level $V_{TH}$ is established by the voltage divider 50 and 52 in conjunction with the reference voltage at terminal 56, and defines the limit for proper operation of the load from the output voltage ($V_L$) of the power system as seen on line 44. As earlier indicated voltage $V_L$ will be proportional, by some proportionality constant, to the voltage seen at node 32. $V_L$ is indicated as a constant value since this is the regulated output of the system.

When the transistor 18 is conducting, the voltage of capacitor 24 will be applied to the primary 14 of the transformer 16. Because of the phasing of the transformer windings and the positioning of the diodes 28 and 40 with respect to the secondary windings, the energy from capacitor 24 can only transfer to the core of the transformer. When transistor 18 turns off and ceases to conduct, the voltages on the several transformer windings reverse and the energy in the core is transferred to the output filter capacitors, capacitors 30 and 42.

The regulator function controls the output energy via the pulse width/off period ratio. This ratio balances the energy input to the output demand to thus maintain $V_L$ constant so long as possible. Thus it is seen in FIG. 3 that with the declining voltage ($V_C$) on the capacitor 24 an increasingly long "on time" is required of the transistor 18.

Still with respect to the fourth trace of FIG. 3, with a declining $V_C$ voltage, the voltage $V_S$ at the transformer secondary 38 becomes increasingly less negative until, such as is shown at time $t_o$, it becomes of lesser magnitude than the threshold voltage. In accordance with the earlier description and as indicated by the fifth trace of FIG. 3, the timing signal $V_{TS}$ as it appears on line 57 and which is applied to the one-shot 58 will occur so long as the $V_S$ signal is above the threshold voltage. Thus, in all instances except the last instance as shown in FIG. 3, trace 5, the $V_{TS}$ signal will exceed the threshold value (see, for example, time $t_1$) during the period of the base frequency from the oscillator 76 resetting the one-shot 58. As such, as shown in the last trace of FIG. 8, up until the last period, the output of a one-shot stays at a high level indicating a satisfactory condition. However, in the last period, starting at time $t_0$ because the $V_{TS}$ signal did not exceed the threshold value, the timing signal did not change from the high to the low level and thus there was no signal provided to the one-shot and, as shown in the bottom trace at time $t_2$, the one-shot will time out and produce an alarm signal.

Figure 4:
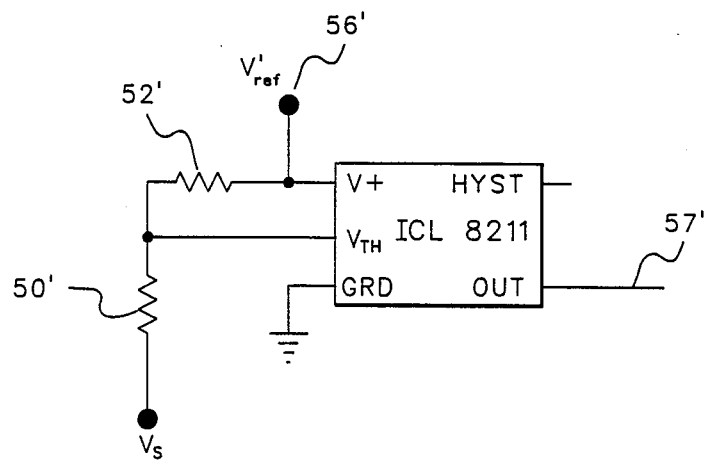

FIG. 4 is included to show that other forms of voltage sensing schemes may be employed. Here, prime designations have been used in place of the designations as earlier shown and transistor 54 is replaced by a suitable integrated circuit chip such as that supplied by Intersil under its designation ICL8211. The chip output on line 57' is the timing signal such as would be applied to one-shot 58. Because of the similarity between this depiction and the one that was earlier described, further definition and explanation is believed unnecessary.

Thus, there has been described a relatively inexpensive detection system, involving comparatively few components of signal level size, which inherently takes advantage o the isolation features of the transformer to provide an efficient and accurate level detector to provide an alarm suitable for alerting a load to take corrective action as necessary.

While the present invention has been shown and described in what is presently being considered as the preferred embodiments, modifications thereto will readily occur to those skilled in the art. For example, certain signals and representations have been indicated as having specific polarities and relationships, it is obvious and considered to be equivalent that different polarities and appropriate logic could be employed with equal facility. It is not intended, therefore, that the appended claims be limited to the specific embodiment as shown and described and it is intended to include all such modifications as fall within the true spirit and scope of the invention.

What is claimed is:

1. A method of detecting reduced input voltage to a a pulse width modulated regulated switching power supply comprising the steps:
   (a) charging a capacitor from said input voltage to a value representative of such voltage;
   (b) periodically discharging said capacitor through a transformer primary winding by periodically rendering a switching means conductive and selectively rendering said switching means non-conductive;
   (c) developing a power supply output voltage utilizing a transformer secondary winding in circuit with means permitting current through said secondary winding only when said switching means is non-conductive;
   (d) sensing a voltage across said secondary winding in the absence of current therethrough and generating a timing signal during periods when said voltage exceeds, in magnitude, a predetermined value; and
   (e) generating an alarm signal indicative of reduced input voltage in the absence of said timing signal for a predetermined period of time.

2. A method in accordance with claim 1 wherein said switching means is rendered conductive at a predetermined frequency and rendered non-conductive in response to the value of the charge on said capacitor.

3. The method in accordance with claim 2 wherein said predetermined period of time is greater than the period of said predetermined frequency.

4. A method of generating an alarm signal indicative of a reduced input voltage to a pulse width modulated regulated switching power supply comprising the
   (a) charging a capacitor from said input voltage to a voltage value representative of said input voltage;
   (b) periodically discharging said capacitor through a transformer primary winding by periodically rendering conductive and selectively rendering non-conductive a switching means;
   (c) developing a power supply output voltage utilizing a transformer secondary winding in circuit with rectifying means permitting current through said secondary winding only when said switching means is non-conducting;
   (d) sensing a secondary voltage across said secondary winding in the absence of current therethrough and generating timing signal during periods when said secondary voltage exceeds, in magnitude, a predetermined voltage value; and
   (e) generating an alarm signal in the absence of said timing signal for a predetermined period of time.

5. The method in accordance with claim 4 wherein said switching means is rendered conductive at a predetermined frequency and rendered non-conductive in response to the voltage value of the charge on said capacitor.

6. The method in accordance with claim 5 wherein said predetermined period of time is greater than the period of said predetermined frequency.

7. The method in accordance with claim 4 wherein said predetermined voltage value is approximately equal to a desired value of said power supply output voltage.

8. In a pulse width modulated regulated switching power supply of the type including a storage capacitor charged from a voltage source and discharged through a transformer primary winding upon operation of a switching means and a transformer secondary winding having in series circuit therewith rectifying means and a filter capacitor for providing an output load voltage, said rectifying means being polarized to conduct when said switching means is not conducting, means for sensing a reduction in the voltage of said voltage source comprising:
   (a) a voltage level detector connected to said transformer secondary winding for providing a timing signal when the voltage across said secondary winding exceeds, in magnitude, a predetermined value; and,
   (b) timing means responsive to said timing signal for providing an alarm output signal indicative of a reduction in voltage as a function of the duration of said output signal.

9. The invention in accordance with claim 8 wherein said timing means is a re-triggerable monostable multivibrator having a predetermined timeout period.

10. The invention in accordance with claim 9 further including control means to periodically render said switching means conductive at a prescribed frequency and wherein said timeout period is longer than the period of the frequency of rendering said switching means conductive.

11. The invention in accordance with claim 8 wherein said voltage level detector comprises a resistor voltage divider and additional switching means biased to be rendered conductive to develop said timing signal at said predetermined level.

12. The invention in accordance with claim 8 wherein said predetermined value is approximately equal to a prescribed value of said output load voltage.

13. The invention in accordance with claim 11 wherein said predetermined value is approximately equal to a prescribed value of said output load voltage.

14. The invention in accordance with claim 10 wherein said voltage level detector comprises a resistor voltage divider and additional switching means biased to be rendered conductive to develop said timing signal at said predetermined level.

* * * * *